(12) United States Patent
Bowes et al.

(10) Patent No.: US 9,224,111 B2
(45) Date of Patent: Dec. 29, 2015

(54) MESSAGE QUEUE BASED PRODUCT ASSET MANAGEMENT AUDITING SYSTEM

(75) Inventors: James R. Bowes, Dartmouth (CA); Devan C. Goodwin, Halifax (CA)

(73) Assignee: Red Hat, Inc., Raleigh, NC (US)

( * ) Notice: Subject to any disclaimer, the term of this patent is extended or adjusted under 35 U.S.C. 154(b) by 420 days.

(21) Appl. No.: 13/035,734

(22) Filed: Feb. 25, 2011

(65) Prior Publication Data

US 2012/0221444 A1 Aug. 30, 2012

(51) Int. Cl.
*G06F 21/00* (2013.01)
*G06Q 10/06* (2012.01)
*G06F 21/10* (2013.01)
*G06Q 30/00* (2012.01)

(52) U.S. Cl.
CPC ............. *G06Q 10/06* (2013.01); *G06F 21/10* (2013.01); *G06Q 30/016* (2013.01)

(58) Field of Classification Search
CPC ....................................................... G06F 21/10
USPC ................. 705/30, 902, 59; 709/224, 223
See application file for complete search history.

(56) References Cited

U.S. PATENT DOCUMENTS

| | | | | |
|---|---|---|---|---|
| 6,631,363 | B1 * | 10/2003 | Brown et al. ................. | 709/224 |
| 8,121,899 | B2 | 2/2012 | Walker et al. | |
| 8,473,593 | B1 | 6/2013 | Graham et al. | |
| 2001/0049717 | A1 * | 12/2001 | Freeman et al. ............. | 709/203 |
| 2002/0099822 | A1 | 7/2002 | Rubin et al. | |
| 2004/0024652 | A1 | 2/2004 | Buhse et al. | |
| 2005/0102240 | A1 | 5/2005 | Misra et al. | |
| 2006/0059253 | A1 * | 3/2006 | Goodman et al. ............ | 709/223 |
| 2007/0198429 | A1 | 8/2007 | Coley et al. | |
| 2007/0289028 | A1 * | 12/2007 | Vaughan et al. ................ | 726/30 |
| 2008/0091454 | A1 | 4/2008 | Fisher, Jr. | |
| 2008/0215492 | A1 | 9/2008 | Pieper et al. | |
| 2008/0313632 | A1 * | 12/2008 | Kumar et al. ................. | 718/100 |
| 2008/0320582 | A1 | 12/2008 | Chen et al. | |
| 2009/0177698 | A1 | 7/2009 | Chan et al. | |
| 2012/0005041 | A1 * | 1/2012 | Mehta et al. ................. | 705/27.1 |
| 2012/0054107 | A1 * | 3/2012 | Biswas et al. ................... | 705/53 |
| 2012/0158413 | A1 | 6/2012 | Goodwin et al. | |
| 2012/0197811 | A1 | 8/2012 | Kearney et al. | |
| 2012/0221709 | A1 | 8/2012 | Bowes et al. | |

OTHER PUBLICATIONS

USPTO Restriction Requirement for U.S. Appl. No. 13/034,115 mailed Feb. 1, 2013.
USPTO Office Action for U.S. Appl. No. 13/034,115 mailed Apr. 10, 2013.
USPTO Office Action for U.S. Appl. No. 13/034,115 mailed Oct. 9, 2013.
USPTO Office Action for U.S. Appl. No. 12/969,437 mailed Jan. 9, 2013.

(Continued)

*Primary Examiner* — Hunter Wilder
(74) *Attorney, Agent, or Firm* — Lowenstein Sandler LLP

(57) ABSTRACT

A server detects a product asset management operation and generates an event message corresponding to the product asset management operation. The event message includes data describing the product asset management operation. The server sends the event message to one or more message queues. One or more listeners that are associated to the one or more message queues can obtain the event message to perform an auditing action that indicates to a user an occurrence of the product asset management operation.

20 Claims, 6 Drawing Sheets

(56) References Cited

OTHER PUBLICATIONS

USPTO Office Action for U.S. Appl. No. 12/969,437 mailed Aug. 13, 2014.
USPTO Office Action for U.S. Appl. No. 13/018,633 mailed Jan. 14, 2013.
USPTO Office Action for U.S. Appl. No. 13/018,633 mailed Jul. 17, 2013.
USPTO Office Action for U.S. Appl. No. 13/018,633 mailed Aug. 15, 2014.
USPTO Office Action for U.S. Appl. No. 13/034,115 mailed Oct. 8, 2014.
USPTO Office Action for U.S. Appl. No. 13/034,115 mailed Mar. 17, 2015.
USPT Office Action for U.S. Appl. No. 12/969,437 mailed Mar. 2, 2015.
USPTO Office Action for U.S. Appl. No. 13/018,633 mailed Mar. 9, 2015.

* cited by examiner

MESSAGE QUEUE BASED PRODUCT ASSET MANAGEMENT AUDITING SYSTEM

TECHNICAL FIELD

Embodiments of the present invention relate to product asset management. Specifically, the embodiments of the present invention relate to auditing product asset management.

BACKGROUND

A software provider can sell software and/or service products, for example, by selling subscriptions to customers for products. An entity that has purchased a product subscription is an owner of the subscription and has a right to use the product for the period of the subscription. An owner's use of a subscription can be represented, for example, as an 'entitlement.' For example, a customer, such as ACME Company, purchases ten 3-year subscriptions to Enterprise Software ABC. ACME Company is the owner of the ten subscriptions, which can be represented by ten entitlements, and can assign the ten entitlements to various systems. A consumer is an entity that has been granted an entitlement to allow the entity to receive product updates. When a system is granted an entitlement, the system is a consumer that can receive product updates for the Enterprise Software ABC.

Product asset management tools are provided to allow software providers and customers to manage the product subscriptions that have been purchased, the subscriptions that have been consumed, the patches, updates, and maintenance of the products, etc. A large number of product asset management related operations occur at any given time. For example, consumers are created and deleted, entitlements are created and granted, etc. Conventional product asset management tools, however, do not provide users, such as system administrators, the capability to easily audit the various product asset management operations that occur.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for auditing product asset management. A server detects a product asset management operation and generates an event message corresponding to the product asset management operation. The event message includes data describing the product asset management operation. The server sends the event message to one or more message queues. One or more listeners that are associated to the one or more message queues can obtain the event message to perform an auditing action that indicates to a user an occurrence of the product asset management operation.

Conventional product asset management tools do not provide users, such as system administrators, the capability to easily audit the various product asset management operations that occur. 'Audit' and 'auditing' hereinafter refers to recording event data pertaining to an operation and providing the event data to one or more users. Embodiments of the present invention provide a convenient mechanism to automatically audit product asset management events and to allow users to configure auditing actions to be performed using the event data. For example, the event data can be used to log product asset management events in a log file, and/or record product asset management events in a database.

Figure 1:
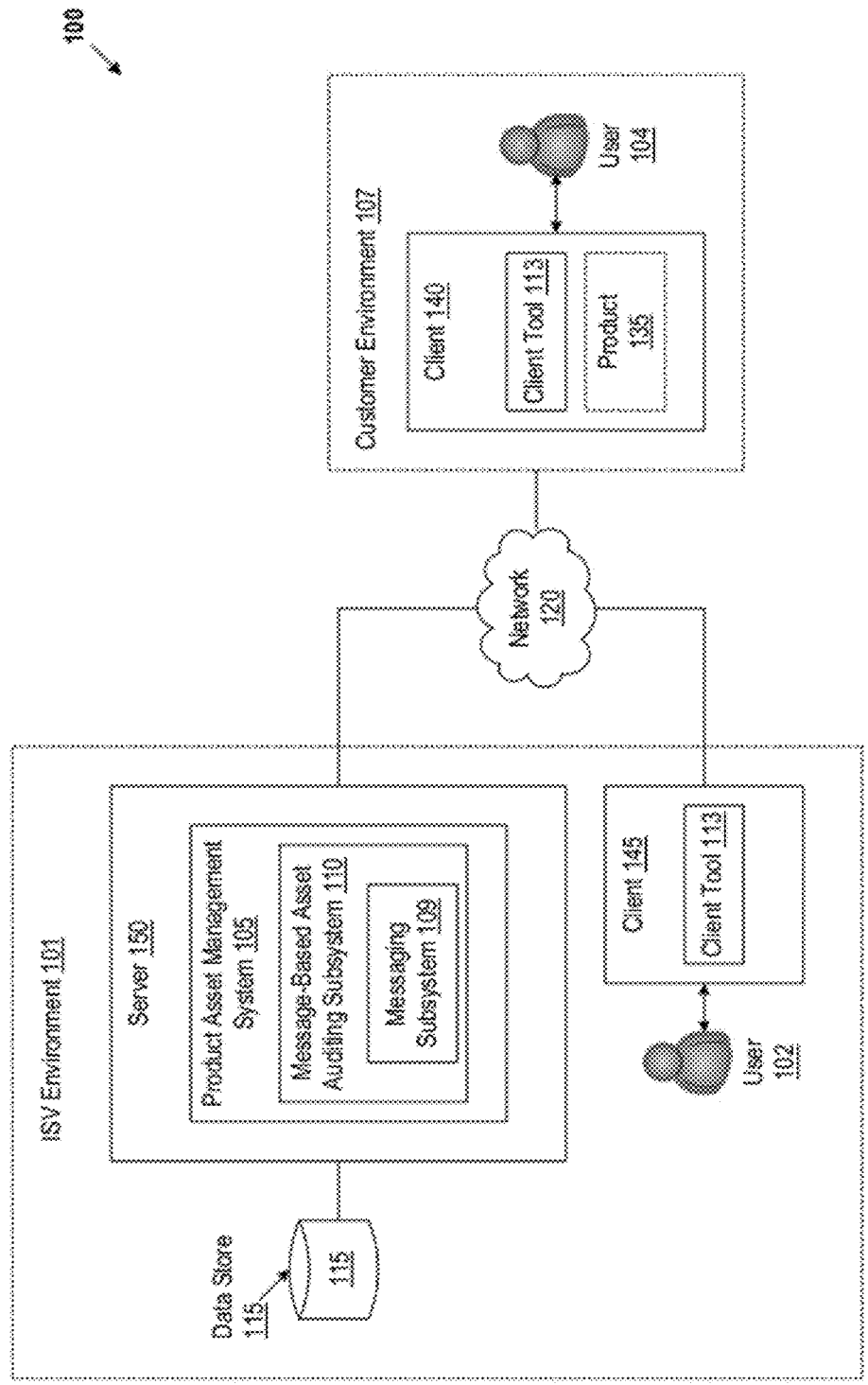
FIG. 1 is an exemplary network architecture in which embodiments of the present invention may operate.

FIG. 1 is an exemplary network architecture 100 in which embodiments of the present invention can be implemented. The network architecture 100 can include a software provider environment, such as an independent software vendor (ISV) environment 101, communicating with one or more customer environments 107 via a network 120. A customer environment 107 includes one or more clients 140 communicating with the server 150 via the network 120. The network 120 can be a local area network (LAN), such as an intranet within a company, a wireless network, a mobile communications network, a wide area network (WAN), such as the Internet, or similar communication system. The network 120 can include any number of networking and computing devices such as wired and wireless devices.

Software providers can develop and/or sell software and/or service products. A software provider can be a large software company that develops and sells operating system platforms, an ISV that develops and sells specialized software to run on an operating system platform, and/or an independent service provider (ISP) that does not develop, but sells products. For brevity and simplicity, an ISV is used as an example of a software provider throughout this document.

Customers that purchase subscriptions are owners of the subscriptions. A subscription purchase is an owner's right to use the product for the period of the subscription. An owner's use of a subscription can be represented, for example, as an 'entitlement.' Software may or may not already be installed on an entity. Software that is already installed on an entity can be somewhat usable, even if the entity is not granted an entitlement for the installed software. When an entity is granted an entitlement for the software, the entity can access a product repository to receive software updates. For example, an ISV develops and sells Enterprise Software ABC. A customer, ACME Company, purchases ten 3-year subscriptions to Enterprise Software ABC, which is represented by ten entitlements. ACME Company may already have the Enterprise Software ABC installed in one or more of its systems. When a system is granted an entitlement for the Enterprise Software ABC the system can receive updates for the Enterprise Software ABC. A consumer is an entity that has been granted an entitlement to allow the entity to receive product updates. For example, when an entity is granted an entitlement for the Enterprise Software ABC, the entity is a consumer of the Enterprise Software ABC. Examples of entities include, and are not limited to, a person, a client computing system, a server computing system, a domain, etc.

Software providers and customers can track which product subscriptions have been purchased and which of the purchased subscriptions have been consumed. The tracking of purchased and consumed products is hereinafter referred to as 'product asset management.' Product asset management can also include tools to manage the consumers in their environments. These tools may, for example, allow system administrators to manage patches, updates, monitoring and maintenance of the entitlements, etc. A software provider environment, such as ISV environment 101, can include a server 150 that hosts a product asset management system 105 for managing product assets in the one or more customer environments 107. The product asset management system 105 can include, for example, a Java web application based on a REST (Representational State Transfer) client-server architecture that exposes a REST API. A server 150 can be hosted by any type of computing device including server computers, gateway computers, desktop computers, laptop computers, hand-held computers or similar computing device. An exemplary computing device is described in greater detail below in conjunction with FIG. 6.

The product asset management system 105 can perform a number of operations to manage products assets of one or more owners, such as creating and deleting consumers (e.g., create ConsumerID123 on Jan. 1, 2011 at 05:30 pm, delete ComsuerID456 on Jan. 10, 2011 at 02:30 pm), start consumption of an entitlement from a pool (e.g., assign EntitlementSerial98765 to ConsumerID123 on Jan. 1, 2011 at 06:30 pm), stop consumption of an entitlement from a pool, maintaining a pool count (e.g., remove assignment of EntitlementSerial98765 to ConsumerID123 on Feb. 1, 2011 at 05:30 pm), etc. An event can be the occurrence of a product asset management operation. Conventional product asset management tools do not provide users, such as system administrators, the capability to easily audit the various product asset management events. The product asset management system 105 can include a message-based asset auditing subsystem 110 to automatically generate and store product asset management event data that represents the occurrence of the operation and perform auditing actions using the event data. In one embodiment, the message-based asset auditing subsystem 110 includes a messaging subsystem 109 hosted in the same server computing system. An example of a messaging subsystem 109 can include, and is not limited to, HornetQ® from JBoss®, ActiveMQ® from The Apache Software Foundation etc. In another embodiment, the messaging subsystem 109 can be hosted by a server computing system that is separate from the server computing system hosting the product asset management system 105, and the message-based asset auditing subsystem 110 can be coupled to the messaging subsystem 109.

The messaging subsystem 10 can configure one or more listeners to receive event messages pertaining to product asset management operations that occur. An event message includes data that describes an event. Examples of event data can include, and are not limited to, a principal performing a product asset management operation (e.g., a system performing an action, a user performing an action), a date of the event, a time of the event, an event type (e.g., created, updated, deleted, etc.), an event target (e.g., consumer, owner entitlement, etc.), and an owner identifier for an owner (e.g., a unique ID for an owner), an object identifier, etc. A listener can be implemented as program code that when executed can obtain event messages, collect data from an event message, and perform an auditing action using the collected data. For example, a LoggingListener can receive an event message indicating that the product asset management system 105 created ConsumerID123 on Jan. 1, 2011 at 05:30 pm. The LoggingListener can obtain the consumer identifier, date, and time of the event from the message, and use the data to update an audit log stored in the data store 115 indicating that ConsumerID123 was created on Jan. 1, 2011 at 05:30 pm. A user 102, such as a system administrator, can access the audit log and see that ConsumerID123 was created and see data pertaining to this event.

In one embodiment, the product asset management system 105 exposes a programmatic REST interface, which a client tool 113 hosted by a client 140,145 can communicate with. In one embodiment, a client tool 113 can be any kind of tool which could communicate with the REST interface. For example, a user 102, such as an ISV system administrator, can use the client tool 113 to communicate with the product asset management system 105 to manage product patches and product updates of the consumers in the one or more customer environments 107. In another example, a user 104, such as an ACME Company system administrator, can use the client tool 113 to communicate with the product asset management system 105 to consume a product 135 on a client 140. Other examples of a client tool 113, can include and are not limited to, a web interface, web browser, or other client software that can communicate with the REST interface. The client machines 140,145 can be hosted by any type of computing device including server computers, gateway computers, desktop computers, laptop computers, mobile communications devices, cell phones, smart phones, hand-held computers, or similar computing device. An exemplary computing device is described in greater detail below in conjunction with FIG. 6.

A data store 115 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 2:
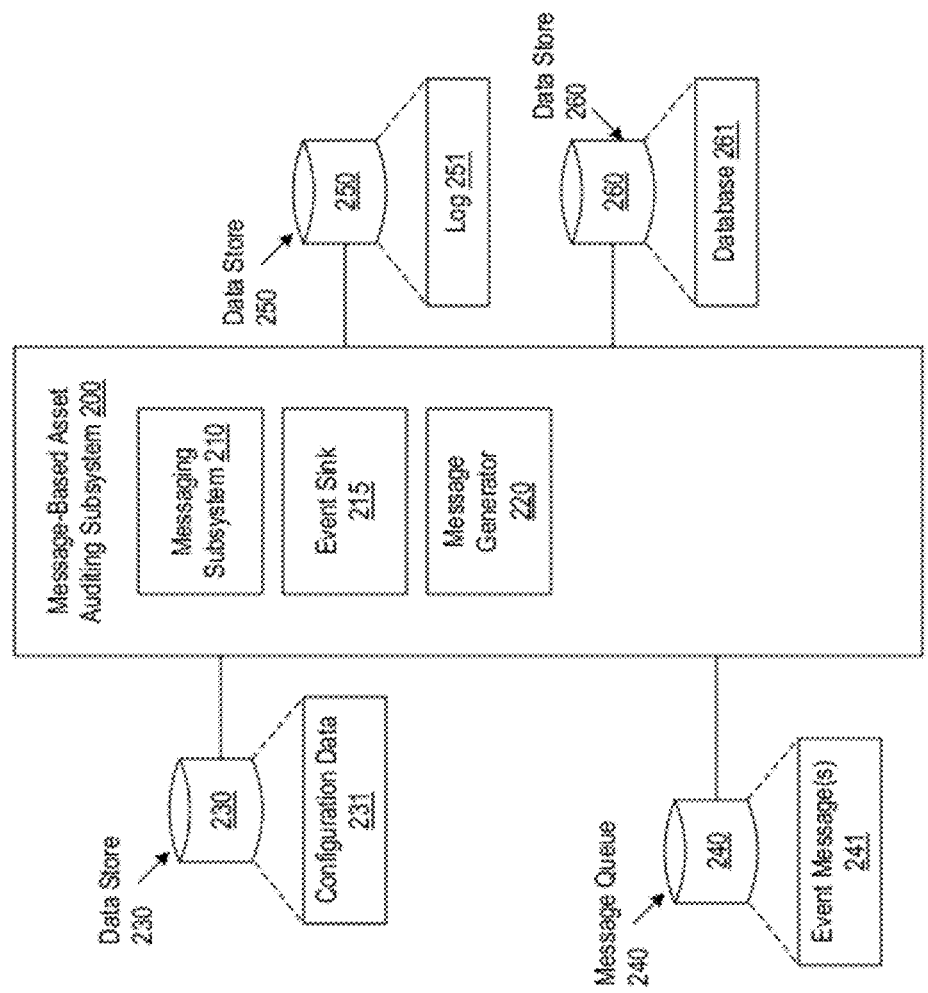
FIG. 2 is a block diagram of one embodiment of a product asset management system.

FIG. 2 is a block diagram of one embodiment of a message-based asset auditing subsystem 200 for auditing product asset management. The message-based asset auditing subsystem 200 can be the same as the message-based asset auditing subsystem 110 in a product asset management system 105 hosted by a server 150 of FIG. 1. In one embodiment, the message-based asset auditing subsystem 200 includes a messaging subsystem 210, hosted in the same computing system. In another embodiment, the message-based asset auditing subsystem 200 is coupled to a messaging subsystem 210 hosted on a separate computing system. The message-based asset auditing subsystem 200 can also include an event sink 215 and a message generator 220.

The messaging subsystem 210 can receive input to create one or more listeners that receive event messages 241 pertaining to product asset management events from one or more message queues 240. An event message 241 includes data that describes a product asset management operation that occurred. A listener can be implemented as program code that when executed can obtain event messages 241 from a message queue 240, collect event data from the event message 241, and perform an auditing action using the collected event data, such as updating an audit log file 251 and/or an audit database 261. For example, the messaging subsystem 210 can create an EmailListener to receive event messages and can send an email to recipients that provides information relating to the event. The message-based asset auditing subsystem 200 can be coupled to one or more data stores 250,260 that store the product asset management audit data. Examples of audit data can include, and are not limited to, an audit log file 251, an audit database 261, etc.

The input that defines the one or more listeners to be created can be user input received via a graphical user interface provided by the messaging subsystem 210 to a client. The message-based asset auditing subsystem 200 enables a third party to specify listeners to perform auditing actions and the actions to be performed. A third party is a third party to a developer of the product asset management system. For example, a third party, such as an ISV, can configure an EmailListener to email a system administrator when entitlements expire, can configure a LoggingListener to log events in an audit log file 251, can configure a DatabaseListener to update an audit database 261 with event data, can configure an ExternalListener to send messages to external systems indicating the operations that have occurred. In one embodiment, the message-based asset auditing subsystem 110 includes default listeners to receive event messages 241 from queues 240 and to perform auditing actions.

The messaging subsystem 210 can create one or more message queues 240 in one or more data stores. A queue 240 can store event messages 241 until the event messages 241 are obtained by a listener. In one embodiment, the messaging subsystem 210 creates a queue 240 for each listener. When a listener is configured to receive event messages 241, the messaging subsystem 210 can create a message queue 240 for the particular listener. Providing a queue 240 for each listener can ensure that an event message 241 is delivered to each listener. In another embodiment, the messaging subsystem 210 can create a single queue 240 having multiple listeners that subscribe to the queue 240, and each listener can receive a copy of the messages 241 in the queue 240. The messaging subsystem 210 can update configuration data 231 that is stored in a data store 230 to create a message queue 240 for a listener.

A product asset management system can perform a number of operations to manage products assets for one or more owners. Examples of product asset management operations can include, and are not limited to, creating an owner, deleting an owner, creating a pool of entitlements, receiving registration data from an entity that registers with the product asset management system, assigning an identity certificate to a registered entity, updating consumer facts data of an entity, determining a list of subscriptions that are available to an entity, generating a representation of an entitlement to be granted to an entity, creating a consumer, deleting a consumer, start consumption of an entitlement from a pool, stop consumption of an entitlement from a pool, maintaining a pool count, authorizing and authenticating a user, etc.

An event can be the occurrence of a product asset management operation. When a product asset management operation occurs, the message generator 220 can generate an event message 241 for the event. There can be one event message 241 for each audited event. An event message 241 can include event data that describes the event. Examples of event data can include, and are not limited to, a principal performing a product asset management operation (e.g., a system performing an action, a user performing an action), a date of the event, a time of the event, an event type (e.g., created, updated, deleted, etc.), an event target (e.g., consumer, owner entitlement, etc.), and an owner identifier for an owner of an object (e.g., a unique ID for an owner), an object identifier, etc.

The message generator 220 can provide a generated event message 241 to the event sink 215. The event sink 215 can be configured as a message producer that is enabled to send event messages 241 to the messaging system 210. The messaging system 210 can receive the event messages 241 and can post the event messages 241 in the one or more queues 241 that are configured to store the event messages 241. The queues 240 can store the event messages 241 until a listener obtains the message 241.

A listener can start a connection with a corresponding queue 240 and can detect that one or more event messages 241 are stored in the queue 240. An event message 241 includes event data, for example, an event target and an event type, that describes the event. A listener can use the event data (e.g., event target, event type) to determine whether to ignore a message 241 in the queue 240 or to obtain the message 241 from the queue 240. When a listener obtains a message 241 from a queue 240, the listener can collect data from the message 241, and perform an auditing action using the collected data. Examples of auditing actions, can include, and are not limited to, updating an audit log file 251 stored in data store 250 using the collected data from the message 241, updating an audit database 261 stored in data store 260 using the collected data, sending a notification to one or more recipients indicating the occurrence of the product asset management operation, etc. Examples of a recipient can include, and are not limited to, a client device, an external message system (e.g., AMQP messaging system), etc.

Figure 3:
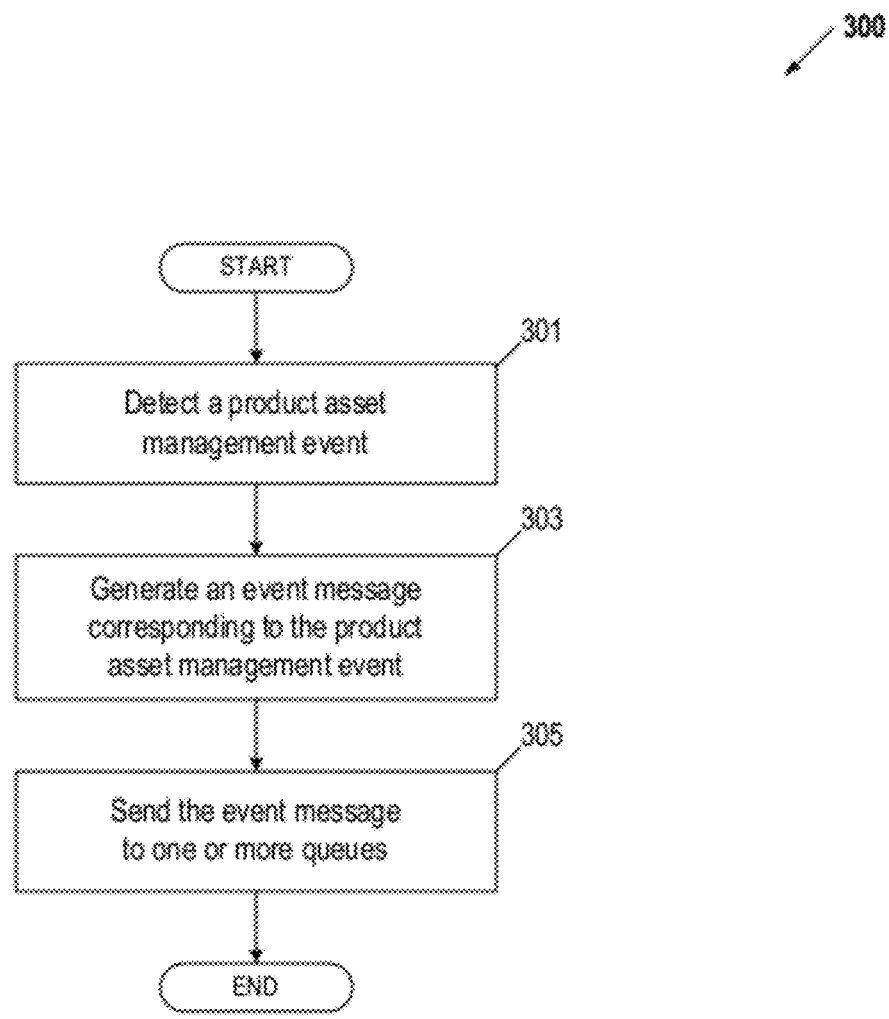
FIG. 3 is a flow diagram of an embodiment of a method for generating and sending a message in a queue to audit a product asset management operation.

FIG. 3 is a flow diagram of an embodiment of a method 300 for generating and sending a message to a queue to audit a product asset management event. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the message-based asset auditing subsystem 110 in a product asset management system 105 hosted by a server 150 of FIG. 1.

In one embodiment, the method 300 starts with the message-based asset auditing subsystem detecting an occurrence of a product asset management operation at block 301. At block 303, the message-based asset auditing subsystem generates an event message corresponding to the event and sends the event message to one or more message queues at block 305. The message-based asset auditing subsystem can send the event message to a messaging subsystem, which can determine which queue(s) to store the message in. The messaging subsystem can store a copy of the event message to the one or more queues. Subsequently, a listener that corresponds to a queue can obtain the event message from the queue and perform an auditing action using data in the event message.

Figure 4:
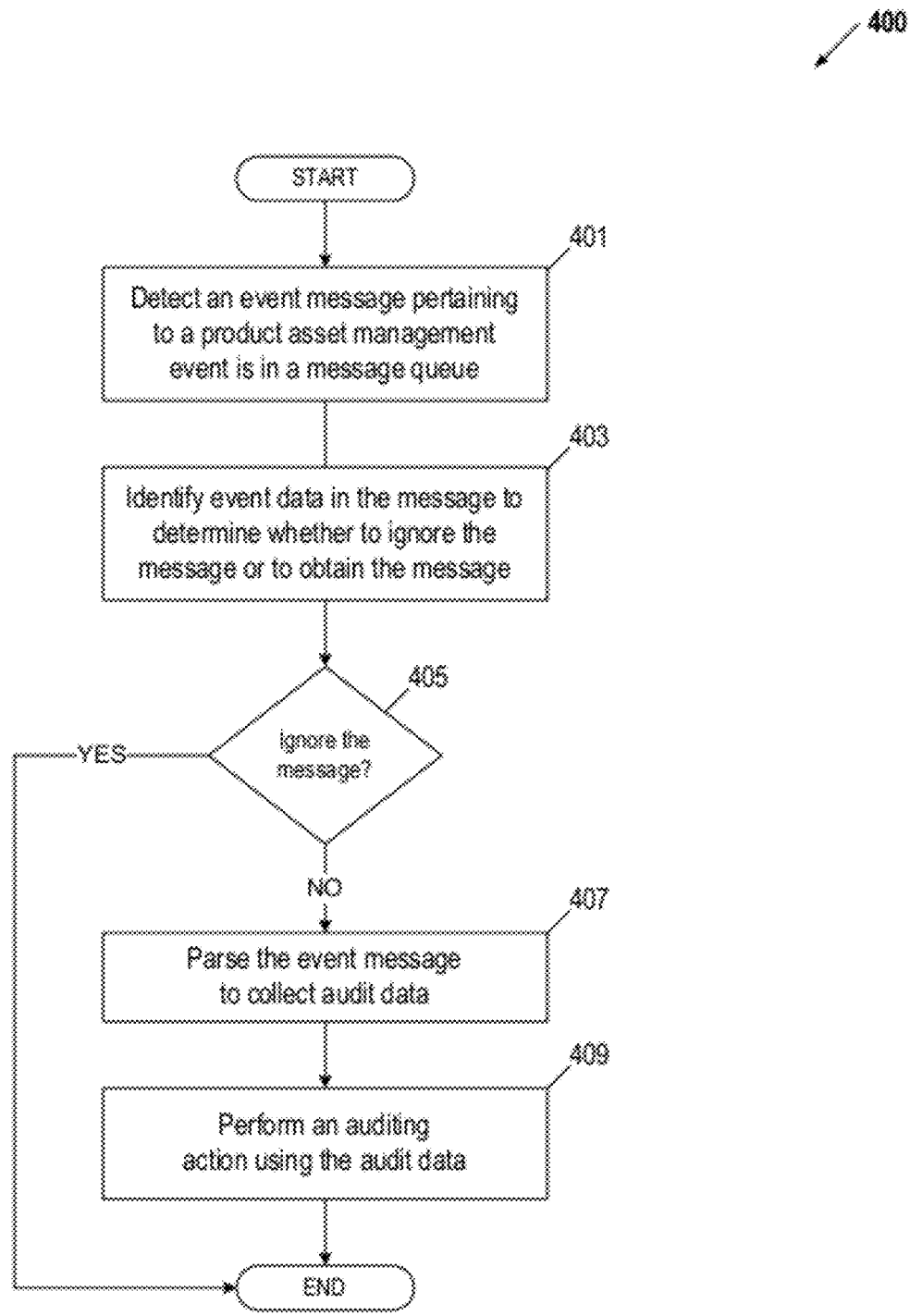
FIG. 4 is a flow diagram of an embodiment of a method for using a message pertaining to a product asset management operation in a queue to audit the product asset management operation.

FIG. 4 is a flow diagram of an embodiment of a method 400 for using a message pertaining to a product asset management event in a queue to audit the product asset management event. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the message-based asset auditing subsystem 110 in a product asset management system 105 hosted by a server 150 of FIG. 1.

In one embodiment, the method 400 starts with a listener in the message-based asset auditing subsystem starting a connection with a corresponding queue and detecting one or more event messages that are stored in the queue at block 401. The event messages pertain to product asset management events. At block 403, the listener identifies event data in the event message to determine whether to ignore the event message or to obtain the message from the queue. The event data that is to be used to make the determination can be configured, for example, via the listener program code. For example, when the listener program code is executed, the listener may be configured to identify the event target and event type in the message to determine whether to ignore or to obtain the message from the queue. For instance, an entitlement for a particular product for a system may be deleted and the system can no longer receive software updates for that particular product. A system administrator may wish to receive emails when such operations occur. An EmailListener may be configured to send an email to one or more recipients (e.g., system administrator) if the event target in the event message is set to "entitlement" and if the event type in the event message is set to "deleted." At block 405, the listener determines whether to ignore or to obtain the message based on the identified event data.

If the message is not to be ignored (block 405), the listener parses the event data in the event message to collect data to be used in performing an auditing action at block 407. The listener can collect some or all of the event data in the event message. The collected data is hereinafter referred to as audit data. The audit data to be collected can be configured, for example, via the listener program code. For example, when the listener program code is executed, the listener may be configured to collect a date of the event, a time of the event, an event type (e.g., created, updated, deleted, etc.), an event target (e.g., consumer, owner entitlement, etc.).

At block 409, the listener performs an auditing action using the audit data. Examples of auditing actions, can include, and are not limited to, updating an audit log file using the collected data from the message, adding/updating a database entry/record in an audit database using the collected data, sending a notification to one or more recipients indicating the occurrence of the product asset management operation, etc. Examples of a recipient can include, and are not limited to, a client device, an external message system (e.g., AMQP messaging system), etc. For example, a LoggingListener and DatabaseListener can receive an event message from their corresponding queues indicating that a consumer identifier 'ConsumerID123' was created on Jan. 1, 2011 at 05:30 pm. The LoggingListener can collect the consumer identifier, date, and time of the event, and update an audit log indicating that ConsumerID123 was created on Jan. 1, 2011 at 05:30 pm. The DatabaseListener can obtain the consumer identifier, date, and time of the event, and update the audit database indicating that ConsumerID123 was created on Jan. 1, 2011 at 05:30 pm. A system administrator can access the audit log and/or the audit database to see that ConsumerID123 was created and see data pertaining to the event.

Figure 5:
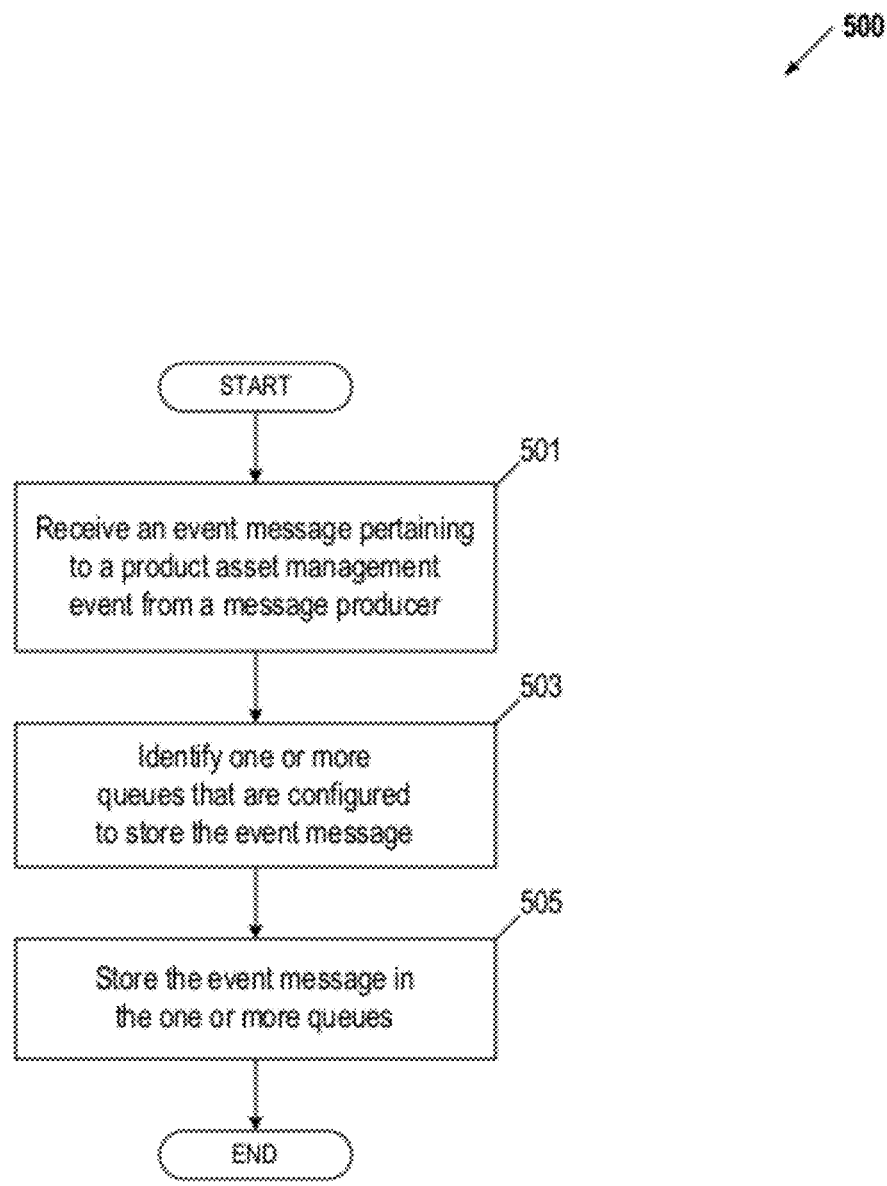
FIG. 5 is a flow diagram of an embodiment of a method for storing a message pertaining to a product asset management operation in a queue.

FIG. 5 is a flow diagram of an embodiment of a method 500 for storing a message pertaining to a product asset management event in a queue. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the messaging subsystem 109 hosted by a server 150 including a product asset management system 105 of FIG. 1. In another embodiment, method 500 is performed by a messaging subsystem 109 hosted by a server separate from a server 150 including a product asset management system 105 of FIG. 1. In one embodiment, the method 500 starts with the messaging subsystem receiving an event message from a message producer (e.g., a message generator 220 in a message-based asset auditing subsystem 200 in FIG. 2) at block 501. At block 503, the messaging subsystem identifies one or more queues that are configured to store the message or a copy of the message and posts the message to the one or more queues at block 505.

Figure 6:
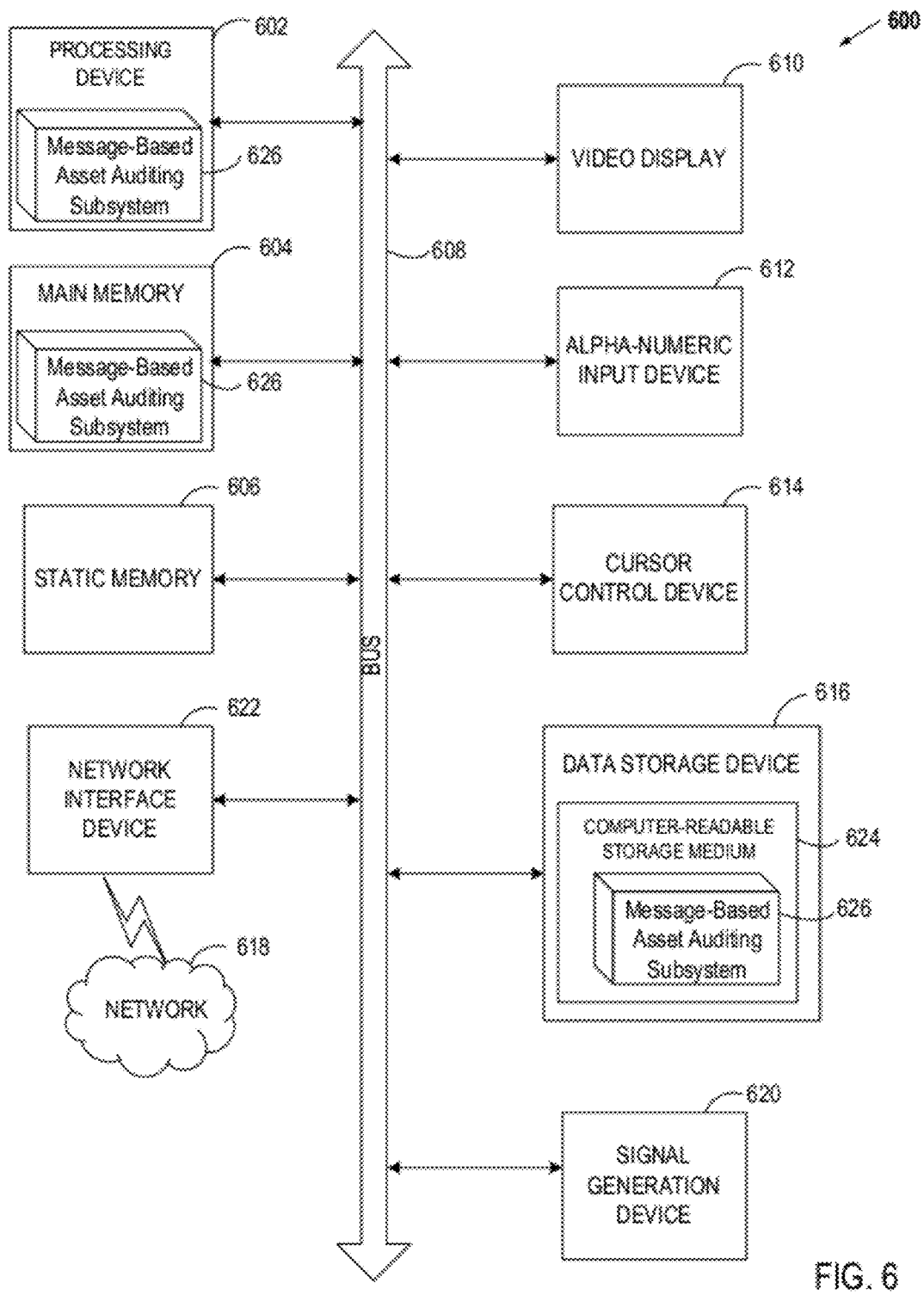
FIG. 6 is a diagram of one embodiment of a computer system for auditing product asset management events.

FIG. 6 is a diagram of one embodiment of a computer system for auditing product asset management. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the message-based asset auditing subsystem 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the message-based asset auditing subsystem 626) embodying any one or more of the methodologies or functions described herein. The message-based asset auditing subsystem 626 may also reside, completely or at least partially, within the main memory 604 and/or within the processing device 602 during execution thereof by the computer system 600, the main memory 604 and the processing device 602 also constituting machine-readable storage media. The message-based asset auditing subsystem 626 may further be transmitted or received over a network 618 via the network interface device 622.

The computer-readable storage medium 624 may also be used to store the message-based asset auditing subsystem 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The message-based asset auditing subsystem 626, components and other features described herein (for example in relation to FIG. 1) can be implemented as discrete hardware components or integrated in the functionality of hardware components such as ASICS, FPGAs, DSPs or similar devices. In addition, the message-based asset auditing subsystem 626 can be implemented as firmware or functional circuitry within hardware devices. Further, the message-based asset auditing subsystem 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "detecting," "generating," "sending," "updating," "parsing," "performing," "identifying," "determining," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for auditing product asset management is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

creating a plurality of message listeners to obtain, from corresponding message queues, one or more event messages associated with consuming a product, the plurality of message listeners comprising a first message listener to generate updated data based on the one or more event messages and a second message listener to generate notifications based on the one or more event messages;

creating a first message queue corresponding to the first message listener and a second message queue corresponding to the second message listener;

determining which one or more queues from the first message queue and the second message queue to store a received event message based on the event message, the event message representing an occurrence of a product asset management operation associated with consumption of the product;

detecting, in the first message queue and the second message queue, the event message;

identifying, in the event message in the first message queue and the second message queue, an event type describing an action performed by the product asset management operation and a target associated with the action performed by the product asset management operation, wherein the target is at least one of a consumer, an owner, or an entitlement;

generating, by a processing device, a notification in view of the type of action performed and the target described in the event message in response to the event message being identified in the second message queue;

generating, by the processing device, updated data in view of the type of action and the target described in the event message in response to the event message being identified in the first message queue, the updated data representing the occurrence of the product asset management operation; and providing the notification and the updated data to one or more users to indicate occurrence of the product asset management operation.

2. The method of claim 1, wherein generating updated data comprises at least one of updating an audit log file or updating an audit database.

3. The method of claim 1, wherein the product asset management operation comprises at least one of a consumer created event, a consumer deleted event, a start consuming an entitlement from a pool event, a stop consuming an entitlement from a pool event, an owner created event, an owner deleted event, a pool created event, a change pool count event, or a consumer facts updated event.

4. The method of claim 1, wherein the event message further comprises at least one of a principal performing an operation, a date of an event, a time of the event, or an owner identifier.

5. The method of claim 1, wherein the event message in the first message queue and the second message queue are identical.

6. The method of claim 1, wherein providing the notification comprises:

sending the notification indicating the occurrence of the product asset management operation to at least one of a client device or an external messaging system.

7. The method of claim 6, wherein sending the notification comprises at least one of sending a message to an external messaging system via a message bus or sending an email message to a user device.

8. The method of claim 1, further comprising:

determining by the plurality of message listeners to obtain the event message from the first message queue and the second message queue in view of the target and the event type.

9. A system comprising:

a persistent storage unit comprising a first message queue and a second message queue; and a processing device operatively coupled to the persistent storage unit to:

create a plurality of message listeners to obtain, from corresponding message queues, one or more event messages associated with consuming a product, the plurality of message listeners comprising a first message listener to generate updated data based on the one or more event messages and a second message listener to generate notifications based on the one or more event messages;

create a first message queue corresponding to the first message listener and a second message queue corresponding to the second message listener;

determine which one or more queues from the first message queue and the second message queue to store a received event message based on the event message, the event message representing an occurrence of a product asset management operation associated with consumption of the product;

detect, in the first message queue and the second message queue, the event message;

identify, in the event message in the first message queue and the second message queue, an event type describing an action performed by pertaining to the product asset management operation and a target associated with the action performed by the product asset management operation, wherein the target is at least one of a consumer, an owner, or an entitlement;

generate a notification in view of the type of action performed and the target described in the event message in response to the event message being identified in the second message queue;

generate updated data in view of the type of action and the target described in the event message in response to the event message being identified in the first message queue, the updated data representing the occurrence of the product asset management operation; and provide the notification and the updated data to one or more users to indicate occurrence of the product asset management operation.

10. The system of claim 9, wherein to generate updated data comprises the processing device to at least one of update an audit log file or update an audit database.

11. The system of claim 9, wherein the product asset management operation comprises at least one of a consumer created event, a consumer deleted event, a start consuming an entitlement from a pool event, a stop consuming an entitlement from a pool event, an owner created event, an owner deleted event, a pool created event, a change pool count event, or a consumer facts updated event.

12. The system of claim 9, wherein the event message further comprises at least one of a principal performing an operation, a date of an event, a time of the event, or an owner identifier.

13. The system of claim 9, wherein the event message in the first message queue and the second message queue are identical.

14. The system of claim 9, wherein to provide the notification comprises the processing device to:

send the notification indicating the occurrence of the product asset management operation to at least one of a client device or an external messaging system.

15. The system of claim 14, wherein the notification comprises at least one of a message sent to an external messaging system via a message bus or an email message sent to a user device.

16. The system of claim 13, wherein the processing device to is further to:

determine to obtain the event message from the first message queue and the second message queue in view of the target and the event type.

17. A non-transitory computer-readable storage medium including instructions that, when executed by a processing device, cause the processing device to:

create a plurality of message listeners to obtain, from corresponding message queues, one or more event messages associated with consuming a product, the plurality of message listeners comprising a first message listener to generate updated data based on the one or more event messages and a second message listener to generate notifications based on the one or more event messages;

create a first message queue corresponding to the first message listener and a second message queue corresponding to the second message listener;

determine which one or more queues from the first message queue and the second message queue to store a received event message based on the event message, the event message representing an occurrence of a product asset management operation associated with consumption of the product;

detect, in the first message queue and the second message queue, an event message;

identify, in the event message in the first message queue and the second message queue, an event type describing an action performed by the product asset management operation and a target associated with the action performed by the product asset management operation, wherein the target is at least one of a consumer, an owner, or an entitlement;

generate, by the processing device, a notification in view of the type of action performed and the target described in the event message in response to the event message being identified in the second message queue;

generate, by the processing device, updated data in view of the type of action and the target described in the event message in response to the event message being identified in the first message queue, the updated data representing the occurrence of the product asset management operation; and provide the notification and the updated data to one or more users to indicate occurrence of the product asset management operation.

18. The non-transitory computer-readable storage medium of claim 17, wherein to generate updated data comprises the processing device to at least one of update an audit log file or update an audit database.

19. The non-transitory computer-readable storage medium of claim 17, wherein the product asset management operation comprises at least one of a consumer created event, a consumer deleted event, a start consuming an entitlement from a pool event, a stop consuming an entitlement from a pool event, an owner created event, an owner deleted event, a pool created event, a change pool count event, or a consumer facts updated event.

20. The non-transitory computer-readable storage medium of claim 17, wherein the event message in the first message queue and the second message queue are identical.

* * * * *